July 29, 1947.  E. K. KAPRELIAN  2,424,827

EXTREME APERTURE OBJECTIVE

Filed June 18, 1945

| ELEMENT | GLASS | |
|---|---|---|
| | $n_D$ | $V$ |
| 1 | 1.7340 | 51.1 |
| 2 | 1.7200 | 29.3 |
| 3 | 1.6730 | 32.2 |
| 4 | 1.755 | 47.2 |
| 5 | 1.6201 | 60.3 |
| 6 | 1.7200 | 29.3 |

| ELEMENT | GLASS | |
|---|---|---|
| | $n_D$ | $V$ |
| 1 | 1.6110 | 58.8 |
| 2 | 1.7200 | 29.3 |
| 3 | 1.7200 | 29.3 |
| 4 | 1.6201 | 60.3 |
| 5 | 1.6201 | 60.3 |
| 6 | 1.7200 | 29.3 |

| ELEMENT | GLASS | |
|---|---|---|
| | $n_D$ | $V$ |
| 1 | 1.755 | 47.2 |
| 2 | 1.7200 | 29.3 |
| 3 | 1.7200 | 29.3 |
| 4 | 1.7340 | 51.1 |
| 5 | 1.7200 | 29.3 |
| 6 | 1.5170 | 64.5 |
| 7 | 1.5230 | 50.5 |

Edward K. Kaprelian
INVENTOR.

Patented July 29, 1947

2,424,827

UNITED STATES PATENT OFFICE 2,424,827

EXTREME APERTURE OBJECTIVE

Edward K. Kaprelian, Alexandria, Va.

Application June 18, 1945, Serial No. 599,975

12 Claims. (Cl. 88—57)

This invention relates to photographic objectives of extreme aperture; i. e., apertures approaching the theoretical limit of f/0.5 for dry systems.

The system described herein is a modification of the arrangement known in the art as the Petzval type which is essentially a pair of achromats spaced fairly far apart, customarily one-third to one-half the focal length of the system.

One object of the invention is to provide an extreme aperture objective having a reasonably simple construction.

Another object of the invention is to provide an extreme aperture system which is sufficiently well corrected to permit motion picture photography of X-ray fluoroscope images and of cathode ray screen images as well as of any poorly illuminated object where rapid exposure is desirable.

Another object of the invention is to provide an extreme aperture objective which is well suited for projection purposes.

Another object is to provide an extreme aperture telescope eyepiece which is suitable for photographic purposes.

Still another object is to provide an extreme aperture photographic objective which provides a back focal length sufficiently great to permit use in existing photographic equipment.

These and other objects are attained by adding to the conventional Petzval system two additional components, one of which is negative in power and the other positive in power and by so choosing the indices of refraction of the glasses and the relative powers and shapes of the additional components that extreme apertures of the order of f/0.7 are possible with good correction for chromatic and spherical aberration as well as for coma, astigmatism, curvature of field and distortion. In attaining these objects it is preferable to retain the two pairs of the Petzval system substantially achromatic and substantially spherically corrected, such chromatic and spherical aberration as cannot be balanced out between the two additional components being corrected by residuals in the two original Petzval pairs.

These and other objects will become apparent in the accompanying specification and drawing in which.

Figure 1:
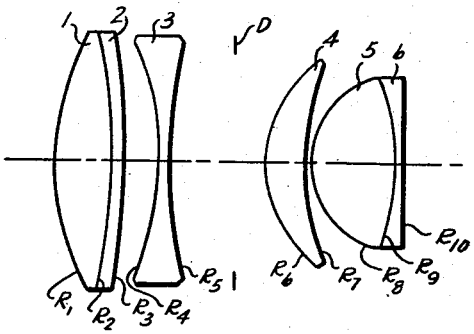
Fig. 1 shows one form of objective in accordance with the invention.

The objective of Fig. 1 comprises six lenses arranged so that the first and last pairs of crowns 1, 5 and flints 2, 6 are cemented together as shown with an air spaced flint 3 and an air spaced crown 4 located between. In the construction shown, pairs 1, 2 and 5, 6 are substantially achromatic, there being only enough chromatic over-correction or under-correction left in each pair to compensate for the longitudinal chromatic aberration remaining from lenses 3 and 4. In the present example lens 1 is of high-index low-dispersion glass such as one type of non-silica glass known to the art. Lenses 2 and 6 are extra dense flints while lens 3 is a medium dense flint. Collective meniscus 4 is an extra-high index glass of very low dispersion and is similar in type to the glass of lens 1. Lens 5 is an extra-dense crown. In the preferred form this objective is constructed so that lens 4 is aplanatic, or substantially so, and $R_4$ and $R_6$ are approximately equal to the focal length of the objective. This arrangement provides an increase in crown indices together with a lowering of flint indices as compared with previous designs of lenses of this general type, thus resulting in a flatter, larger field. An f/0.7 lens of 54 mm. focal length constructed in accordance with this system and utilizing the closest glass-types available covers satisfactorily a semi-field of 17 degrees.

The arrangement shown is particularly well suited for cinematography in that it provides a relatively long back focus, necessary to provide space for the shutter mechanism and occasionally for a turret arrangement, and is due to a shifting toward the image, of the rear nodal point resulting from the placing of a large negative power (lens 3) near the front or long conjugate end of the system and the placing of a large positive power (meniscus 4) near the rear or short conjugate end of the system. It is possible, with the arrangement of Fig. 1, to provide a lens of f/0.7 aperture and 33 mm. focal length which can be fitted directly into the standard aperture threads of most 16 mm. motion picture cameras. Focusing is accomplished by moving elements 1, 2 and 3 as a unit relative to elements 4, 5 and 6, the latter being mounted in the lens barrel in fixed relation to the focal plane.

Figure 2:
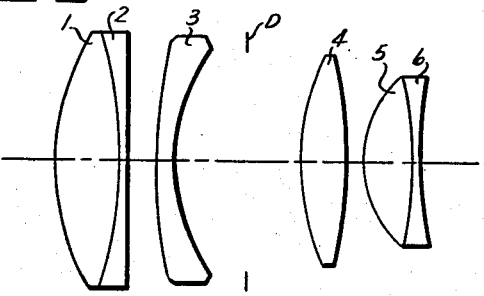
Fig. 2 shows a modification of the objective shown in Fig. 1.
Figure 3:
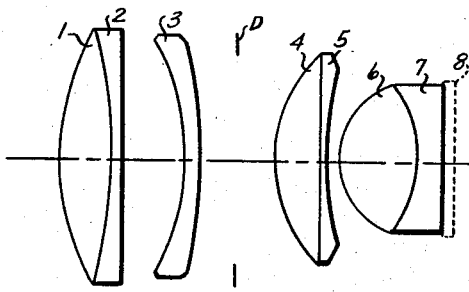
Fig. 3 shows a further modification.

The system of Fig. 1 as well as those of Figs. 2 and 3 will be well corrected if the second or negative component 3 is given a power of .55 to .85 that of the first component comprising lenses 1 and 2. The third component 4 must have a power greater than the first component while the fourth component 5, 6 must have a greater power than the third. Thus it is seen that the powers of the positive components increase in the direction of light travel. The powers of the negative elements preferably likewise increase in power in the direction of light travel. This arrangement results in good astigmatic correction and flatness of field, element 6 being so close to the focal plane as to make a substantial contribution to the Petzval sum without contributing appreciably to some of the other aberrations.

While the shapes of the elements in the three examples shown vary considerably they do have, in general, a common distribution of power. In each example the focal length of elements 1 and 2 combined is between three and four times the focal length of the entire system while the focal length of element 3 is minus approximately five times the focal length. In each example, the component immediately to the rear of the diaphragm (elements 4 in Figs. 1 and 2 and elements 4 and 5 in Fig. 3) have a focal length of between 1.75 and 2.20 times the focal length of the system. The last semiachromatic pair (5 and 6 in Figs. 1 and 2, and 6 and 7 in Fig. 3) have a focal length of 1.4 and 1.7 times the focal length of the system. The overall length of the entire objective from front to rear elements is approximately twice the focal length of the system. The spacing between the two components in front of the diaphragm is between .35 and .65 of the focal length while the spacing between elements 3 and 4 is approximately .5 to .85 of the focal length. In the modification of Fig. 1 the spacing between elements 4 and 5 should be very small, preferably less than 3% of the focal length of the system and where practical may be made small enough to avoid contact between the elements. In the modification of Fig. 2 this spacing should not exceed 10% of the focal length, and this figure should not be exceeded in the spacing between elements 5 and 6 in the modification of Fig. 3.

In the modification of Fig. 2 pairs 1, 2 and 5, 6 remain essentially achromatic as in Fig. 1. Negative lens 3 assumes the form of a meniscus, however, while lens 4 is biconvex. In both lenses 3 and 4 the surface having the shorter radius faces the diaphragm. In this construction old and well known glasses are utilized to produce a lens having an aperture of approximately f/0.6 and a usable semi-field of 11°. This construction is especially well suited for projection purposes in conjunction with wide aperture condensers.

The modification of Fig. 3 is intended for astronomical photography and for kinematography and is primarily an immersion lens. Pairs 1—2, 4—5 and 6—7 are under corrected chromatically for optimum correction of aberrations. Lens 3 and doublet 4, 5 are menisci with their collective surfaces facing the diaphragm. Pairs 1—2 and 4—5 utilize high index, low dispersion crowns to provide a large difference in v or reciprocal of dispersive power between the crown and flint while maintaining a higher v for the crowns than for the flints. Lenses 6 and 7 are low in index for a reason that will appear presently.

The thickness of lens 7 is chosen so that its rear surface, that is the surface nearest the image, falls within a few millimeters of the image plane, the system having been computed so that this surface is plane. A sheet 8 of plane parallel glass, or of optically polished plastic, is placed against the rear plane surface of lens 7, its thickness being chosen so that the rear surface of sheet 8 falls in the plane of the image. Sheet 8 may be held in place by cementing with a low melting point balsam or plastic so that it may be removed or replaced without disturbing the cement between elements 6 and 7. In the event of scratching or wear of sheet 8 it may thus be replaced conveniently. In still photography the plate or film may be oiled to the rear surface of sheet 8 with an oil of proper refractive index, while for cinematography the film may advance in contact with sheet 8 after being oiled or while in an oil bath. A low index crown and flint combination is necessary at 6 and 7 to provide optical homogeneity at the surface between elements 7 and 8.

In certain cases, as for astronomical photography, it may be desirable to deform the film to fall in the plane of sharpest imagery, in which case the rear surface of sheet 8 may be suitably curved.

While the invention has been illustrated and described in several particular embodiments it is contemplated that changes in the components and in such features as spacing, construction and glass types may be made within the spirit and scope of the appended claims.

Having thus described the invention, what is claimed is:

1. In an extreme aperture objective of the Petzval type, front and rear semi-achromatic doublets having their most strongly curved faces toward the incident light and having a separation between 1.0 and 1.2 times the focal length of the objective, a negative correcting lens spaced rearwardly of the front doublet a distance between 0.35 and 0.65 of the focal length of the objective and receiving light therefrom, a positive member between said negative correcting lens and said rear doublet and spaced from the doublet by a space between zero and 0.10 of the focal length of the objective and acting to converge light received from said negative correcting lens.

2. In an extreme aperture objective comprised of four spaced components, a first component comprising a doublet having a focal length between three and four times the focal length of the objective and being at least partially corrected for chromatic and spherical aberration, a second component having a negative focal length between 4.5 and 5.5 of that of the objective and positioned rearwardly of said first component by a distance between 0.35 and 0.65 of the focal length of the objective, a third component having a focal length between 1.75 and 2.2 times that of the objective and spaced rearwardly of said second component by a distance between 0.5 and 0.85 of the focal length of the objective and a fourth component comprising a doublet spaced rearwardly between zero and 0.10 of the focal length of the objective and at least partially corrected for chromatic and spherical aberrations and having a focal length between 1.4 and 1.7 times that of the objective.

3. In an extreme aperture lens of the Petzval type comprising four spaced components, the first and fourth of which are crown and flint doublets having their surfaces of strongest curvature facing the incident light, the focal length of the front doublet being between 1.7 times and 3 times that of the last doublet, the second component being spaced rearwardly of the first doublet by a distance between 0.35 and 0.65 of the focal length of the objective and having a negative focal length between 4.5 and 5.5 of the focal length of the objective, the third component being positive and having a focal length between 1.75 and 2.2 of the objective and spaced forwardly of the last doublet by a distance less than 0.10 of the focal length of the objective, the powers of the positive components increasing in the direction of light travel.

4. In an extreme aperture objective of the Petzval type comprising four spaced components, the first and fourth of which are crown and flint doublets separated by a distance between 1 and 1.2 times the focal length of the objective, each doublet including one positive and one negative element with the crown element of each doublet facing the incident light, the first doublet having a focal length between three and four times that of the objective and the last doublet having a focal length between 1.4 and 1.7 times that of the objective, the second component having a negative focal length between 4.5 and 5.5 times that of the objective and spaced rearwardly of the front component by a distance between 0.35 and 0.65 of the focal length of the objective, and the third component being positive and having a focal length between 1.75 and 2.20 times that of the system, said third component being spaced in front of the rear doublet by a spacing less than 0.10 of the objective, whereby the powers of the positive components increase in the direction of light travel and the powers of the negative components increase in the direction of light travel.

5. An objective as claimed in claim 2, the second component assuming the form of a meniscus with the surface of longer radius facing incident light.

6. An objective as claimed in claim 2, the second component assuming the form of a meniscus with the surface of shorter radius facing incident light.

7. An objective as claimed in claim 2, the second component assuming the form of a single element of double concave form.

8. An objective as claimed in claim 2, the third component being meniscus in form with the surface of shorter radius of curvature facing incident light.

9. An objective as claimed in claim 2, the third component being bi-convex in form with the surface of shorter radius of curvature facing incident light.

10. An objective as claimed in claim 3 in which the third component is a crown meniscus with its surface of shorter radius of curvature facing incident light.

11. An objective as claimed in claim 3 in which the third component is a bi-convex crown element with its surface of shorter radius facing incident light.

12. An objective as claimed in claim 3, the surfaces of shorter radius of curvature of the second and third components facing the diaphragm.

EDWARD K. KAPRELIAN.

REFERENCES CITED

The following references are of record in the file of this patent:

UNITED STATES PATENTS

| Number | Name | Date |
|---|---|---|
| 1,967,836 | Merte | July 24, 1934 |
| 660,202 | Rudolph | Oct. 23, 1900 |
| 1,888,156 | Bielicke | Nov. 15, 1932 |
| 660,747 | Bausch | Oct. 30, 1900 |
| 1,797,202 | Warmisham | Mar. 17, 1931 |